(12) United States Patent
Tokumura et al.

(10) Patent No.: US 10,941,267 B2
(45) Date of Patent: *Mar. 9, 2021

(54) HEAT-EXPANDABLE MICROSPHERES AND APPLICATION THEREOF

(71) Applicant: MATSUMOTO YUSHI-SEIYAKU CO., LTD., Yao (JP)

(72) Inventors: Sachiko Tokumura, Yao (JP); Yu Kita, Yao (JP)

(73) Assignee: MATSUMOTO YUSHI-SEIYAKU CO., LTD., Osaka (JP)

(*) Notice: Subject to any disclaimer, the term of this patent is extended or adjusted under 35 U.S.C. 154(b) by 309 days.

This patent is subject to a terminal disclaimer.

(21) Appl. No.: 15/575,125

(22) PCT Filed: May 18, 2016

(86) PCT No.: PCT/JP2016/064690
§ 371 (c)(1),
(2) Date: Nov. 17, 2017

(87) PCT Pub. No.: WO2016/190178
PCT Pub. Date: Dec. 1, 2016

(65) Prior Publication Data
US 2018/0142076 A1   May 24, 2018

(30) Foreign Application Priority Data
May 27, 2015  (JP) .............................. JP2015-107415

(51) Int. Cl.
| C08J 9/32 | (2006.01) |
| C08F 2/44 | (2006.01) |
| C08F 220/06 | (2006.01) |
| B01J 13/14 | (2006.01) |
| C08J 9/228 | (2006.01) |
| C08L 33/18 | (2006.01) |

(52) U.S. Cl.
CPC ................. *C08J 9/32* (2013.01); *B01J 13/14* (2013.01); *C08F 2/44* (2013.01); *C08F 220/06* (2013.01); *C08J 9/228* (2013.01); *C08L 33/18* (2013.01)

(58) Field of Classification Search
CPC ... B01J 13/14; B01J 13/18; C08F 2/44; C08F 220/06; C08F 220/20; C08F 220/44; C08F 2222/1013; C08J 9/18; C08J 9/228; C08J 9/32; C08L 33/18; C09K 3/00
See application file for complete search history.

(56) References Cited

U.S. PATENT DOCUMENTS

| 6,235,394 | B1* | 5/2001 | Shimazawa | ............... B01J 13/18 |
| | | | | 106/14.35 |
| 10,093,783 | B2* | 10/2018 | Tokumura | ................ B01J 13/14 |
| 2005/0026067 | A1 | 2/2005 | Masuda et al. | |
| 2009/0176098 | A1* | 7/2009 | Masuda | .................... B01J 13/14 |
| | | | | 428/407 |
| 2011/0263746 | A1* | 10/2011 | Kawaguchi | .............. B01J 13/14 |
| | | | | 521/182 |
| 2012/0080131 | A1 | 4/2012 | Teratani et al. | |
| 2013/0065975 | A1* | 3/2013 | Natsui | ...................... B01J 13/14 |
| | | | | 521/57 |
| 2017/0335082 | A1 | 11/2017 | Tokumura | |
| 2019/0194415 | A1* | 6/2019 | Tayagaki | ................. B01J 13/18 |

FOREIGN PATENT DOCUMENTS

| CN | 101291958 A | 10/2008 |
| CN | 107001911 A | 8/2017 |
| EP | 1 952 880 A1 | 8/2008 |
| JP | 62-286534 A | 12/1987 |
| JP | 2012-077303 A | 4/2012 |
| JP | 2013-010900 A | 1/2013 |
| JP | 2014-019750 A | 2/2014 |
| JP | 2014-224261 A | 12/2014 |
| JP | 2015-021066 A | 2/2015 |
| JP | 2015-027737 A | 2/2015 |
| WO | 1999/043758 A1 | 9/1999 |
| WO | 2007/049616 A1 | 5/2007 |
| WO | 2011/118437 A1 | 9/2011 |

OTHER PUBLICATIONS

International Search Report for PCT/JP2016/064690 dated Jun. 28, 2016.
Communication (SE) dated Oct. 4, 2018 from the Swedish Patent Office in counterpart application No. 1751454-8.
Communication dated Aug. 22, 2019 from the China National Intellectual Property Administration in corresponding application No. 201680024548.7.

* cited by examiner

Primary Examiner — John M Cooney
(74) Attorney, Agent, or Firm — Sughrue Mion, PLLC

(57) ABSTRACT

Heat-expandable microspheres and applications thereof, the heat-expandable microspheres including a thermoplastic resin shell and a thermally-vaporizable blowing agent encapsulated therein. The thermoplastic resin is produced by polymerizing a polymerizable component containing (A) a nitrile monomer including methacrylonitrile, (B) a carboxyl-group-containing monomer and (C) a monomer having a functional group reactive with the carboxyl group. The polymerizable component satisfies the following conditions 1 and 2:

Condition 1: The weight fraction of the monomers (A), (B) and (C) in the polymerizable component satisfy the inequality shown below.

Weight fraction of the monomer (C)<Weight fraction of the monomer (A)≤Weight fraction of the monomer (B)    Inequality (I)

Condition 2: The ratio by weight of the monomer (B) to the monomer (C) ranges from 600:1 to 3:1.

11 Claims, 1 Drawing Sheet

HEAT-EXPANDABLE MICROSPHERES AND APPLICATION THEREOF

CROSS-REFERENCE TO RELATED APPLICATIONS

This application is a National Stage of International Application No. PCT/JP2016/064690 filed May 18, 2016 which claims priority from Japanese Patent Application No. 2015-107415 filed May 27, 2015, the contents of all of which are incorporated herein by reference in their entirety.

BACKGROUND OF THE INVENTION

1. Field of the Invention

The present invention relates to heat-expandable microspheres and applications thereof. Specifically, the present invention relates to heat-expandable microspheres, hollow particles manufactured by expanding the heat-expandable microspheres, a composition containing a base component and at least one particulate material selected from the heat-expandable microspheres and hollow particles, and a formed product manufactured by forming the composition.

2. Description of the Related Art

The heat-expandable microspheres are fine particles, each of which comprises a thermoplastic resin shell and a blowing agent encapsulated therein. Their heat-expandable property allows them to be used in wide application ranges including materials for imparting a design, such as foamable inks and wallpapers, and lightweight fillers for resins and paints.

Heat-expandable microspheres are blended with an aqueous emulsion, solvent binder, resin paste, molten resin and the like to be prepared into a composition which may be stored for a long period of time. Heat-expandable microspheres having insufficient solvent resistance may change their properties during storage resulting in the deterioration of their expansion performance over time, and there has been a need for heat-expandable microspheres having good solvent resistance.

For example, PTL 1 discloses heat-expandable microcapsules (heat-expandable microspheres) having high heat and solvent resistance, manufactured by microencapsulating a volatile blowing agent in a shell of a polymer comprising 80 wt % or more of a nitrile monomer, 20 wt % or less of a non-nitrile monomer and 0.1 to 1 wt % of a cross-linking agent.

PTL 2 discloses heat-resistant heat-expandable microspheres which are expandable in a high temperature region of 240° C. or higher, and which comprise a shell of a polymer produced by polymerizing acrylonitrile (I) as a major monomer, a carboxyl-group-containing monomer (II) and a monomer (III) having a functional group reactive with the carboxyl group of the monomer (II), and a liquid encapsulated in the shell having a boiling point below the softening point of the shell polymer.

PTL 3 discloses heat-expandable microcapsules (heat-expandable microspheres) durable against burst or contraction at high temperatures while retaining a high expansion ratio, the microcapsules comprising a polymer shell and a volatile blowing agent encapsulated therein as the core, wherein the shell comprises a thermosetting resin and a polymer polymerized from a monomer composition containing a nitrile monomer and carboxyl-group-containing monomer, and the thermosetting resin has at least two functional groups reactive with the carboxyl group per molecule and no radically polymerizable double bonds.

The heat-expandable microspheres disclosed in PTL 1, however, have insufficient heat resistance to meet the recent demand for highly heat resistant microspheres. In addition, the heat-expandable microspheres disclosed in PTL 2 and PTL 3 sometimes exhibit insufficient solvent resistance though the microspheres have a sufficiently high heat resistance.

As mentioned above, the related art heat-expandable microspheres cannot simultaneously satisfy the requirements for sufficient expansion performance at high temperatures and good solvent resistance.

[PTL 1] Japanese Patent Application Publication No. 1987-286534
[PTL 2] WO 1999/043758
[PTL 3] WO 2011/118437

SUMMARY OF THE INVENTION

It is therefore an object of the present invention aims to provide heat-expandable microspheres having high heat resistance and good solvent resistance, hollow particles manufactured by expanding the heat-expandable microspheres, a composition containing a base component and at least one particulate material selected from the heat-expandable microspheres and hollow particles, and a formed product manufactured by forming the composition.

Upon diligent study, the present inventors found that heat-expandable microspheres comprising a thermoplastic resin shell produced by polymerizing a specific polymerizable component and a thermally-vaporizable blowing agent encapsulated therein have high heat resistance and good solvent resistance, to thereby achieve the present invention.

Thus, in a first aspect, the present invention provides (1) heat-expandable microspheres comprising a thermoplastic resin shell and a thermally-vaporizable blowing agent encapsulated therein, wherein the thermoplastic resin is produced by polymerizing a polymerizable component containing (A) a nitrile monomer including methacrylonitrile, (B) a carboxyl-group-containing monomer and (C) a monomer having a functional group reactive with the carboxyl-group and wherein the polymerizable component satisfies the following conditions 1 and 2.

Condition 1: The weight fraction of the monomers (A), (B), and (C) in the polymerizable component satisfy the inequality shown below.

$$\text{Weight fraction of the monomer }(C) < \text{Weight fraction of the monomer }(A) \leq \text{Weight fraction of the monomer }(B) \quad \text{Inequality (I)}$$

Condition 2: The ratio by weight of the monomer (B) to the monomer (C) ranges from 600:1 to 3:1.

In a preferred embodiment (2) of the heat-expandable microspheres (1) above, the polymerizable component contains 20 to 65 wt % of the nitrile monomer (A) and 25 to 75 wt % of the carboxyl-group-containing monomer (B). The amount of the monomer (C) having a functional group reactive with the carboxyl-group in the polymerizable component ranges from 0.1 to 10 wt %.

In another preferred embodiment (3) of the heat-expandable microspheres (1) or (2) above, the nitrile monomer (A) comprises 10 to 100 wt % of methacrylonitrile.

In yet another preferred embodiment (4) of the heat-expandable microspheres of (1) or (2) above, the nitrile monomer (A) comprises acrylonitrile and methacrylonitrile.

In yet another preferred embodiment (5) of the heat-expandable microspheres of any of (1) to (4) above, a maximum expansion temperature of the heat-expandable microspheres is not lower than 190° C.

In a second aspect (6), the present invention provides hollow particles manufactured by expanding the heat-expandable microspheres of any of (1) to (5) above.

In a second aspect (7), the present invention provides a base component and at least one particulate material selected from the heat-expandable microspheres of any of (1) to (5) above and the hollow particles of (6) above.

In a third aspect (8), the present invention provides a formed product manufactured by forming (e.g., molding or coating) the composition (7) above.

Advantageous Effects of Invention

The heat-expandable microspheres of the present invention have high heat resistance and good solvent resistance.

The hollow particles of the present invention manufactured from the heat-expandable microspheres have high heat resistance and good solvent resistance.

The composition of the present invention containing the heat-expandable microspheres and/or the hollow particles has high heat resistance and good solvent resistance.

The formed product manufactured by forming the composition is lightweight and has good solvent resistance.

REFERENCE SYMBOLS LIST

Figure 1:
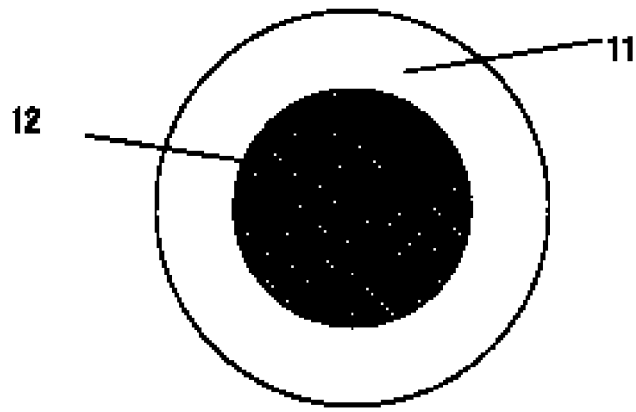
FIG. 1 is a schematic diagram of an example of the heat-expandable microspheres

Reference symbols used to identify various features in the drawings include the following.
11 Thermoplastic resin shell
12 Blowing agent
1 Hollow particles (fine-particle-coated hollow particles)
2 Shell
3 Hollow
4 Fine particle (in a state of adhesion)
5 Fine particle (in a state of fixation in a dent)

DETAILED DESCRIPTION OF THE PREFERRED EMBODIMENTS

The invention will next be described in greater detail by reference to the drawings. However, the present invention should not be construed as being limited thereto.
Heat-Expandable Microspheres As shown in FIG. 1, the heat-expandable microspheres of the present invention comprise a thermoplastic resin shell 11 and a thermally-vaporizable blowing agent (core) 12 encapsulated therein. The heat-expandable microspheres have a core-shell structure and the whole of each microsphere is thermally expandable (expandable by heating). The thermoplastic resin is produced by polymerizing the polymerizable component. The thermoplastic resin is the polymer of the polymerizable component.

The polymerizable component is polymerized into the thermoplastic resin which forms the shell of the heat-expandable microspheres. The polymerizable component essentially contains a monomer component and optionally contains a cross-linking agent. The monomer component is a radically-polymerizable monomer having a polymerizable double bond and is polymerizable by addition polymerization. The cross-linking agent is a radically-polymerizable monomer having a plurality of polymerizable double bonds and introduces cross-linkages in the resultant thermoplastic resin.

The polymerizable component contains the nitrile monomer (A) essentially containing methacrylonitrile (hereinafter also referred to as the monomer (A)), the carboxyl-group-containing monomer (B) (hereinafter also referred to as the monomer (B)) and the monomer (C) having a functional group reactive with the carboxyl-group (hereinafter also referred to as the monomer (C)), and satisfies the conditions 1 and 2 shown below. The polymerizable component satisfying these conditions can be polymerized into a polymer which achieves a balance between polymer softness attributed to its molecular structure and a strong chemical bond between molecules, and such polymer contributes to the production of heat-expandable microspheres satisfying the requirements of expansion performance, heat resistance and solvent resistance.

Condition 1: The weight fraction of the monomers (A), (B) and (C) in the polymerizable component satisfy the inequality shown below.

Weight fraction of the monomer $(C)$<Weight fraction of the monomer $(A)$≤Weight fraction of the monomer $(B)$     Inequality (I)

Condition 2: The ratio by weight of the monomer (B) to the monomer (C) ranges from 600:1 to 3:1.

If the weight percent values of monomers (A), (B) and (C) in the polymerizable component do not satisfy the inequality (I), for example, if "the weight fraction of the monomer (A)> the weight fraction of the monomer (B)", the resultant microspheres have poor heat resistance and solvent resistance. In addition, if "the weight fraction of the monomer (A)< the weight fraction of the monomer (C)≤ the weight fraction of the monomer (B)", the resultant microspheres have poor expansion performance and poor solvent resistance.

As for the inequality (I), the weight fraction of the monomer (A) is preferably smaller than the weight fraction of the monomer (B) for achieving a better effect of the present invention. Similarly, the weight fraction of the monomer (C) is preferably much smaller than the weight fraction of the monomer (A). The much smaller weight fraction of the monomer (C) than the weight fraction of the monomer (A) means that the weight fraction of the monomer (C) is ½ or less of the weight percent value of the monomer (A), preferably ⅕ or less and more preferably ¹⁄₁₀ or less.

As for the condition 2, a ratio by weight of the monomer (B) to the monomer (C) greater than 600:1 causes poor solvent resistance of the resultant microspheres. On the other hand, a ratio by weight of the monomer (B) to the monomer (C) smaller than 3:1 causes poor expansion performance of the resultant microspheres. The ratio by weight of the monomer (B) to the monomer (C) preferably ranges from 500:1 to 3:1, more preferably from 200:1 to 3:1, further more preferably from 180:1 to 5:1, yet further more preferably from 160:1 to 7:1, still further more preferably from 150:1 to 10:1, still further more preferably from 130:1 to 10:1 and most preferably from 100:1 to 15:1.

The nitrile monomer (A) essentially contains methacrylonitrile. The monomers constituting the nitrile monomer (A) other than the methacrylonitrile include acrylonitrile, α-chloroacrylonitrile, α-ethoxyacrylonitrile and fumaronitrile, which may be used in combination with methacrylonitrile. Of these nitrile monomers, the combination of methacrylonitrile and acrylonitrile as the nitrile monomer (A) is preferred for achieving good gas-barrier effect of the resultant microspheres.

The weight fraction of the methacrylonitrile in the nitrile monomer (A) is not specifically restricted and preferably ranges from 10 to 100 wt %, more preferably from 15 to 100 wt %, further more preferably from 20 to 98 wt % and most preferably from 30 to 96 wt %.

The weight fraction of the nitrile monomer (A) in the polymerizable component is not specifically restricted, and preferably ranges from 20 to 65 wt %, more preferably from 20 to 55 wt %, further more preferably from 25 to 50 wt % and most preferably from 25 to 45 wt %. A weight fraction of the nitrile monomer (A) less than 20 wt % may reduce the gas barrier effect of the resultant shell which cannot retain the encapsulated blowing agent. On the other hand, a weight fraction of the nitrile monomer (A) greater than 65 wt % may decrease the heat resistance of the resultant shell.

The carboxyl-group-containing monomer (B) is not specifically restricted except that the monomer should contain at least one free carboxyl group per molecule, and the carboxyl-group-containing monomer (B) includes unsaturated monocarboxylic acids, such as acrylic acid, methacrylic acid, ethacrylic acid, crotonic acid and cinnamic acid; unsaturated dicarboxylic acids, such as maleic acid, itaconic acid, fumaric acid, citraconic acid and chloromaleic acid; anhydrides of unsaturated dicarboxylic acids; and monoesters of unsaturated dicarboxylic acids, such as monomethyl maleate, monoethyl maleate, monobutyl maleate, monomethyl fumarate, monoethyl fumarate, monomethyl itaconate, monoethyl itaconate and monobutyl itaconate. One of or a combination of at least two of these carboxyl-group-containing monomers may be used. A part or the whole of the carboxyl groups of the carboxyl-group-containing monomers may be neutralized during or after polymerization. Of those carboxyl-group-containing monomers mentioned above, acrylic acid, methacrylic acid, maleic acid, maleic acid anhydride and itaconic acid are preferred, acrylic acid and methacrylic acid are more preferred, and, for the high heat resistance of the resultant heat-expandable microspheres, methacrylic acid is most preferred.

The weight fraction of the carboxyl-group-containing monomer (B) in the polymerizable component is not specifically restricted, and preferably ranges from 25 to 75 wt %, more preferably from 30 to 65 wt %, further more preferably from 35 to 60 wt % and most preferably from 40 to 60 wt %. A weight fraction of the carboxyl-group-containing monomer (B) less than 25 wt % may decrease the heat resistance of the resultant microspheres, while an amount of the carboxyl-group-containing monomer (B) greater than 75 wt % may cause poor expansion performance of the resultant microspheres.

The monomer (C) having a functional group reactive with the carboxyl group is not specifically restricted, and includes monomers containing a methylol group, hydroxyl group, amino group, epoxy group or isocyanate group. The monomer (C) may include, for example, N-methylol (meth)acrylamide, N,N-dimethylaminoethyl (meth)acrylate, N,N-dimethylaminopropyl (meth)acrylate, vinyl glicidyl ether, propenyl glicidyl ether, glicidyl (meth)acrylate, glycerin mono(meth)acrylate, 4-hydroxybutylacrylate glicidyl ether, 2-hydroxyethyl (meth)acrylate, 2-hydroxypropyl (meth)acrylate, 2-hydroxybutyl (meth)acrylate, 4-hydroxybutyl (meth)acrylate, 2-hydroxy-3-phenoxypropyl (meth)acrylate and p-hydroxy styrene. The term, (meth) acryl, means acryl or methacryl.

The weight fraction of the monomer (C) in the polymerizable component is not specifically restricted, and preferably ranges from 0.1 to 10 wt %, more preferably from 0.1 to 5 wt %, further more preferably from 0.3 to 4 wt %, and most preferably from 0.5 to 3 wt %. A weight fraction of the monomer (C) less than 0.1 wt % may cause poor solvent resistance of the resultant microspheres. On the other hand, a weight fraction of the monomer (C) greater than 10 wt % may cause poor expansion performance of the resultant microspheres.

The polymerizable component may contain a monomer (D) in addition to the monomers (A), (B) and (C). The monomer (D), which is copolymerizable with the monomers (A), (B) and (C), is not specifically restricted and includes acrylate ester monomers such as methyl (meth) acrylate, ethyl (meth) acrylate, n-butyl (meth) acrylate, isobutyl (meth) acrylate, t-butyl (meth) acrylate, 2-ethylhexyl (meth) acrylate, stearyl (meth) acrylate, lauryl (meth) acrylate, phenyl (meth) acrylate, isobornyl (meth) acrylate, cyclohexyl (meth) acrylate and benzyl (meth) acrylate; (meth) acrylamide monomers such as acrylamide, substituted acrylamide, methacrylamide and substituted methacrylamide; styrene monomers such as styrene, a-methyl styrene, vinyl toluene, t-butyl styrene, p-nitrostyrene and chloromethyl styrene; vinyl ester monomers such as vinyl acetate, vinyl propionate and vinyl butyrate; maleimide monomers, such as N-phenyl maleimide and N-cyclohexyl maleimide; vinyl halide monomers, such as vinyl chloride; vinylidene halide monomers, such as vinylidene chloride; ethylenically unsaturated monoolefin monomers, such as ethylene, propylene and isobutylene; vinyl ether monomers, such as vinyl methyl ether, vinyl ethyl ether and vinyl isobutyl ether; vinyl ketone monomers, such as vinyl methyl ketone; N-vinyl monomers, such as N-vinyl carbazole and N-vinyl pyrolidone; and vinyl naphthalene salts.

The weight fraction of the monomer (D) in the polymerizable component is not specifically restricted, and preferably ranges from 0 to 40 wt %, more preferably from 0 to 30 wt %, further more preferably from 0 to 20 wt % and most preferably from 0 to 15 wt %.

As mentioned above, the polymerizable component may contain a cross-linking agent. The polymerizable component polymerized with the cross-linking agent will control the decrease of the ratio of the blowing agent retained in thermally expanded microspheres (retention of the blowing agent encapsulated in microspheres) and achieve efficient thermal expansion of the microspheres.

The cross-linking agent is not specifically restricted, and includes, for example, aromatic divinyl compounds, such as divinylbenzene; and polyfunctional (meth)acrylate compounds, such as allyl methacrylate, triacrylformal, triallyl isocyanate, ethylene glycol di(meth)acrylate, diethylene glycol di(meth)acrylate, triethylene glycol di(meth)acrylate, neopentyl glycol di(meth)acrylate, polytetramethylene glycol di(meth)acrylate, 1,4-butanediol di(meth)acrylate, 1,6-hexanediol di(meth)acrylate,1,9-nonanediol di(meth)acrylate, PEG (200) di(meth)acrylate, PEG (400) di(meth) acrylate, PEG (600) di(meth)acrylate, trimethylolpropane trimethacrylate, pentaerythritol tri(meth)acrylate, pentaerythritol tetraacrylate, dipentaerythritol hexaacrylate, 2-butyl-2-ethyl-1,3-propanediol diacrylate, and tricyclodecane dimethanol di(meth)acrylate. One of or a combination of at least two of those cross-linking agents may be used.

The amount of the cross-linking agent, which is an optional component, is not specifically restricted, and preferably ranges from 0 to 3.0 parts by weight to 100 parts by weight of the total amount of the nitrile monomer (A), the carboxyl-group-containing monomer (B), the monomer (C) having a functional group reactive with the carboxyl-group, and the monomer (D), more preferably from 0.02 to 1.5 parts by weight, and further more preferably from 0.02 to 1.0 parts by weight. An amount of the cross-linking agent greater than 3.0 parts by weight may result in poor expansion performance of the resultant microspheres.

The blowing agent is vaporizable by heating and encapsulated in the shell of the heat-expandable microspheres to make the whole body of a heat-expandable microsphere thermally expandable (the property with which the whole body of a heat-expandable microsphere expands by heating).

The blowing agent is not specifically restricted and includes, for example, straight-chain hydrocarbons, such as propane, butane, pentane, hexane, heptane, octane, nonane, decane, dodecane, tridecane, tetradecane, pentadecane, hexadecane, heptadecane, octadecane and nonadecane; branched hydrocarbons, such as isobutene, isopentane, isohexane, isoheptane, isooctane, isononane, isodecane, isododecane, 3-methyl undecane, isotridecane, 4-mehtyl dodecane, isotetradecane, isopendadecane, isohexadecane, 2,2,4, 4,6, 8,8-heptamethylnonane, isoheptadecane, isooctadecane, isononadecane, and 2,6,10,14-tetramethyl pentadecane; hydrocarbons, such as cyclododecane, cyclotridecane, hexylcyclohexane, heptylcyclohexane, n-octylcyclohexane, cyclopentadecane, nonylcyclohexane, decylcyclorhexane, pentadecylcyclohexane, hexadecylcyclohexane, heptadecylcyclohexane and octadecylcyclohexane; petroleum ethers; halides of the petroleum ethers; fluorine-containing compounds, such as hydrofluoroether; tetraalkyl silane; and compounds which thermally decompose to generated gases. The blowing agent may be any of straight-chain, branched or alicyclic compounds, and is preferably an aliphatic compound.

The blowing agents may be used alone, or a combination of at least two of the blowing agents may be used. Of these blowing agents, hydrocarbons having 8 or more carbon atoms per molecule are preferred for increasing the maximum expansion temperature of the resultant heat-expandable microspheres and hydrocarbons having 5 or less carbon atoms per molecule are preferred for achieving high pressure resistance of the hollow particles manufactured by heating and expanding the resultant heat-expandable microspheres.

The encapsulation ratio of the blowing agent is defined as the weight percentage of the blowing agent to the weight of the heat-expandable microspheres in which the blowing agent is encapsulated. The encapsulation ratio of the blowing agent is not specifically restricted, and preferably ranges from 1 to 50 wt % of the weight of the heat-expandable microspheres, more preferably from 2 to 45 wt %, further more preferably from 5 to 40 wt %, and most preferably from 10 to 30 wt %.

The heat-expandable microspheres of the present invention comprise a thermoplastic resin shell produced by polymerizing the specific polymerizable component and the core of the blowing agent as mentioned above, and thus the heat-expandable microspheres have high heat resistance and good solvent resistance.

Heat-expandable microspheres having high heat resistance and good solvent resistance include microspheres comprising a thermoplastic resin shell and a thermally vaporizable blowing agent encapsulated therein, wherein the thermoplastic resin is a copolymer produced by polymerizing a polymerizable component containing a carboxyl-group-containing monomer and the microspheres are surface-treated with an organic compound containing a metal of Groups 3 to 12 of the Periodic table or by cross-linking of carboxyl groups and metal ions formed at a proximity surface of the microspheres. Although such heat-expandable microspheres have sufficient heat resistance and solvent resistance, their manufacturing process becomes complex due to the surface treatment with an organic compound after forming heat-expandable microspheres. To the contrary, the heat-expandable microspheres of the present invention have high heat resistance and good solvent resistance without surface treatment with an organic compound containing a metal of Groups 3 to 12 in the Periodic table or cross-linking of carboxyl groups and metal ions at the proximity surface of the microspheres.

Thus, the heat-expandable microspheres of the present invention are preferably manufactured without surface treatment with an organic compound containing a metal of the Groups 3 to 12 in the Periodic table or without cross-linking of carboxyl groups and metal ions at a proximity surface of the microspheres. The heat-expandable microspheres of the present invention are also preferable for a composition or end use in which no metal ions are allowed to be contained in the microspheres due to the adverse effect of metal ions on the components of the composition.

The heat-expandable microspheres of the present invention may be surface-treated with an organic compound containing a metal of the Groups 3 to 12 in the Periodic table or may contain cross-linkages of carboxyl groups and metal ions.

The organic compound containing a metal of the Groups 3 to 12 in the Periodic table includes a compound containing at least one bond represented by formula (II) and/or a metal-amino acid compound:

$$M\text{-}O\text{---}C \qquad (II)$$

where M is a metal of Groups 3 to 12 in the Periodic table, and the carbon atom, C, binds with the oxygen atom, O, and binds only a hydrogen atom and/or carbon atom other than the oxygen atom.

The metal of the Groups 3 to 12 in the Periodic table includes, for example, the Group 3 metals such as scandium, ytterbium and cerium; the Group 4 metals, such as titanium, zirconium and hafnium; the Group 5 metals, such as vanadium, niobium and tantalum; the Group 6 metals, such as chromium, molybdenum and tungsten; the Group 7 metals, such as manganese and rhenium; the Group 8 metals such as iron, ruthenium and osmium; the Group 9 metals, such as cobalt and rhodium; the Group 10 metals, such as nickel and palladium; the Group 11 metals such as copper, silver and gold; and the Group 12 metals, such as zinc and cadmium. The classification of the metals described above is based on the "Periodic Table of Elements (2005)©, Atomic Weight Sub-Committee of The Chemical Society of Japan, 2006", which was bound at the end of "Kagaku-to Kyoiku (Chemistry and Education) vol. 54, No. 4, 2006".

The metal ions constituting the cross-linkage are preferably divalent or polyvalent metal cations, wherein the metal ions may include Al, Ca, Mg, Fe, Ti, Cu, Zn and the like.

The expansion-initiation temperature (Ts) of the heat-expandable microspheres is not specifically restricted, and is preferably at least 130° C., more preferably at least 140° C., further more preferably at least 150° C., yet further more preferably at least 160° C., and most preferably at least 170° C. The upper limit of the expansion-initiation temperature is preferably 300° C.

The maximum expansion temperature (Tm) of the heat-expandable microspheres is not specifically restricted, and is preferably at least 160° C., more preferably at least 180° C., further more preferably at least 190° C., yet further more preferably at least 200° C., and most preferably at least 210° C. The upper limit of the maximum expansion temperature is preferably 350° C. Heat-expandable microspheres having a maximum expansion temperature lower than 160° C. may have insufficient heat resistance. On the other hand, heat-expandable microspheres having a maximum expansion temperature higher than 350° C. may not expand to a sufficient expansion ratio.

The solvent resistance mentioned herein is determined in the following procedure. In a glass vessel, 29 g of N,N-dimethylformamide and 1 g of heat-expandable microspheres are added and shaken for 24 hours to prepare swelled microspheres. Then the mixture is separated by a centrifugal separator to remove the supernatant, and the gel remaining in the glass vessel is dried into a solid in a vacuum oven at 130° C. The weight of the dried matter is measured and the weight change of the heat-expandable microspheres after the immersion in N,N-dimethylformamide is calculated by the following formula.

Weight change (%)=(Weight of the dried matter/ weight of the thermoplastic resin contained in 1 g of the microspheres)×100

A weight change smaller than 100% indicates that the thermoplastic resin constituting the shell of the heat-expandable microspheres is swelled by and dissolved in N,N-dimethylformamide, and a smaller weight change value indicates that the thermoplastic resin constituting the shell of the heat-expandable microspheres is more prone to dissolve in N,N-dimethylformamide. A weight change of 100% or higher indicates that the thermoplastic resin constituting the shell of the heat-expandable microspheres is resistant to swelling by N,N-dimethylformamide to prevent the escape of the encapsulated blowing agent from the microspheres and retain the expansion performance of the microspheres. The weight change of the heat-expandable microspheres of the present invention is preferably at least 100%, more preferably at least 103%, further more preferably at least 105%, yet further more preferably at least 110% and most preferably at least 113%. The upper limit of the weight change is 150%.

The mean particle size of the heat-expandable microspheres is not specifically restricted, and preferably ranges from 0.5 to 200 µm, more preferably from 1 to 100 µm, further more preferably from 3 to 80 µm, yet further more preferably from 7 to 60 µm, and most preferably from 10 to 50 µm. The heat-expandable microspheres having a mean particle size smaller than 0.5 µm may have a low expansion performance. On the other hand, heat-expandable microspheres having a mean particle size greater than 200 µm may not be produced under stable conditions due to unstable polymerization of the shell of such large microspheres to decrease the production efficiency.

The coefficient of variation, CV, of the particle size distribution of the heat-expandable microspheres is not specifically restricted, and is preferably not greater than 50%, more preferably not greater than 45%, and most preferably not greater than 40%. The CV can be calculated by the following expressions (1) and (2).

$$CV = (s/\langle x \rangle) \times 100 (\%) \quad (1)$$

$$s = \left\{ \sum_{i=1}^{n} (x_i - \langle x \rangle)^2 / (n-1) \right\}^{1/2} \quad (2)$$

(where s is a standard deviation of the particle size of the microspheres, $\langle x \rangle$ is a mean particle size of the microspheres, "$x_i$," is the particle size of the i-th microsphere, and n represents the number of the microspheres)

The heat-expandable microspheres of the present invention have a high maximum expansion temperature, high heat resistance and good solvent resistance, and are preferable for application in molding processes, such as injection molding, extrusion molding, calendaring, blow molding, compaction molding, vacuum molding and thermal molding. The microspheres may also be used for blending with pastes, such as vinyl chloride paste, and liquid compositions, such as EVA emulsion, acrylate emulsion and solvent binders.

The maximum expansion ratio of the heat-expandable microspheres is not specifically restricted, and is preferably at least 3 times, more preferably at least 10 times, yet more preferably at least 20 times, further more preferably at least 30 times, yet further more preferably at least 50 times, and most preferably at least 70 times. On the other hand, the upper limit of the maximum expansion ratio is preferably 200 times.

When the heat-expandable microspheres are to be thermally expanded into pressure-resistant hollow particles, the maximum expansion ratio of the heat-expandable microspheres is preferably at least 3 times and the upper limit of the maximum expansion ratio is preferably 100 times in order to make hollow particles having a sufficiently thick shell. Heat-expandable microspheres having a maximum expansion ratio lower than 3 times may fail to sufficiently reduce the density of the material blended with the microspheres, while heat-expandable microspheres having a maximum expansion ratio higher than 100 times may be processed into hollow particles having insufficient pressure resistance.

When a resin composition containing the heat-expandable microspheres particle is heated and expanded into a lightweight article, the maximum expansion ratio of the heat-expandable microspheres is preferably at least 20 times and the upper limit of the maximum expansion ratio is preferably 200 times. Heat-expandable microspheres having a maximum expansion ratio lower than 20 times may cause insufficient expansion of the resultant product containing the heat-expandable microspheres, while the heat-expandable microspheres having a maximum expansion ratio higher than 200 times may cause a rough surface of the resultant product containing the heat-expandable microspheres.

Process for Producing Heat-Expandable Microspheres

The process for producing heat-expandable microspheres of the present invention includes the steps of dispersing an oily mixture containing the polymerizable component, blowing agent and polymerization initiator in an aqueous dispersion medium, and polymerizing the polymerizable component (hereinafter also referred to as the polymerization step).

The polymerization initiator is not specifically restricted, and includes peroxides and azo compounds generally used.

The peroxides include, for example, peroxidicarbonates, such as diisopropyl peroxydicarbonate, di-sec-butyl peroxydicarbonate, di-(2-ethylhexyl) peroxydicarbonate and dibenzyl peroxydicarbonate; diacyl peroxides, such as lauroyl peroxide and benzoyl peroxide; ketone peroxides, such as methylethyl ketone peroxide and cyclohexanone peroxide; peroxyketals, such as 2,2-bis(t-butyl peroxy) butane; hydroperoxides, such as cumene hydroperoxide and t-butyl hydroperoxide; dialkyl peroxides, such as dicumyl peroxide and di-t-butyl peroxide; and peroxyesters, such as t-hexyl peroxypivalate and t-butyl peroxyisobutylate.

The azo compound includes, for example, 2,2'-azobis(4-methoxy-2,4-dimethyl valeronitrile), 2,2'-azobisisobutylonitrile, 2,2'-azobis(2,4-dimethyl valeronitrile), 2,2'-azobis(2-methyl propionate), 2,2'-azobis(2-methyl butylonitrile) and 1,1'-azobis(cyclohexane-1-carbonitrile).

The weight fraction of the polymerization initiator preferably ranges from 0.05 to 10 wt % of 100 parts by weight of the polymerizable component, more preferably from 0.1 to 8 wt %, and most preferably from 0.2 to 5 wt %. A weight fraction of the polymerization initiator lower than 0.05 wt % may leave some of the polymerizable component unpolymerized so as to cause poor solvent resistance of the resultant heat-expandable microspheres. On the other hand, an amount of the polymerization initiator higher than 10 wt % will reduce the heat resistance of the resultant heat-expandable microspheres.

In the production process of the present invention, the oily mixture is dispersed in the aqueous dispersion medium to be prepared into an aqueous suspension, in which the polymerizable component is polymerized.

The aqueous dispersion medium contains water, such as deionized water, as the main component to disperse the oily mixture. The medium may further contain alcohols, such as methanol, ethanol and propanol, and hydrophilic organic solvents, such as acetone. The hydrophilic property mentioned herein means a property of a substance or mixture optionally miscible in water. The amount of the aqueous dispersion medium used in the process is not specifically restricted, and preferably ranges from 100 to 1000 parts by weight to 100 parts by weight of the polymerizable component.

The aqueous dispersion medium may further contain an electrolyte, such as sodium chloride, magnesium chloride, calcium chloride, sodium sulfate, magnesium sulfate, ammonium sulfate, and sodium carbonate. One of or a combination of at least two of these electrolytes may be used. The amount of the electrolyte is not specifically restricted, and preferably ranges from 0.1 to 50 parts by weight to 100 parts by weight of the aqueous dispersion medium.

The aqueous dispersion medium may contain at least one water-soluble compound selected from the group consisting of water-soluble 1,1-substitution compounds having a carbon atom bonded with a hetero atom and with a hydrophilic functional group selected from the group consisting of hydroxyl group, carboxylic acid (salt) groups and phosphonic acid (salt) groups; potassium dichromate; alkali metal nitrite salts; metal (III) halides; boric acid; water-soluble ascorbic acids; water-soluble polyphenols; water-soluble vitamin Bs; and water-soluble phosphonic acids and phosphonate salts. The term "water-soluble" as used herein means that at least 1 g of a substance is soluble in 100 g of water.

The amount of the water-soluble compound contained in the aqueous dispersion medium is not specifically restricted, and preferably ranges from 0.0001 to 1.0 part by weight to 100 parts by weight of the polymerizable component, more preferably from 0.0003 to 0.1 parts by weight, and most preferably from 0.001 to 0.05 parts by weight. An insufficient amount of the water-soluble compound may fail to achieve sufficient effect by the water-soluble compound. On the other hand, an excessive amount of the water-soluble compound may decrease the polymerization rate or increase the amount of the residue of the polymerizable component which failed to be polymerized and formed into the microspheres.

The aqueous dispersion medium may contain a dispersion stabilizer or dispersion stabilizing auxiliary in addition to the electrolytes and water-soluble compounds.

The dispersion stabilizer is not specifically restricted, and includes, for example, calcium triphosphate; magnesium pyrophosphate and calcium pyrophosphate produced by double reaction; colloidal silica; alumina sol; and magnesium hydroxide. One of or a combination of at least two of those dispersion stabilizers may be used.

The amount of the dispersion stabilizer preferably ranges from 0.1 to 30 parts by weight to 100 parts by weight of the polymerizable component, and more preferably from 0.5 to 20 parts by weight.

The dispersion stabilizing auxiliary is not specifically restricted, and includes, for example, polymeric dispersion stabilizing auxiliaries; and surfactants, such as cationic surfactants, anionic surfactants, amphoteric surfactants and nonionic surfactants. One of or a combination of at least two of those dispersion stabilizing auxiliaries may be used.

The aqueous dispersion medium is prepared by blending a water-soluble compound, and optionally a dispersion stabilizer and/or dispersion stabilizing auxiliary, with water (deionized water). The pH of the aqueous dispersion medium during polymerization is adjusted depending on the variants of the water-soluble compound, dispersion stabilizer, and dispersion stabilizing auxiliary.

In the production process of the present invention, the polymerization may be carried out in the presence of sodium hydroxide or the combination of sodium hydroxide and zinc chloride.

In the production process of the present invention, the oily mixture is dispersed and emulsified in the aqueous dispersion medium to be formed into oil globules of a prescribed particle size.

The methods for dispersing and suspending the oily mixture include generally known dispersion techniques, such as agitation with a Homo-mixer (for example, a device manufactured by Tokushu Kika Kogyou Co., Ltd.), dispersion with a static dispersing apparatus such as a Static mixer (for example, a device manufactured by Noritake Engineering Co., Ltd.), membrane suspension technique, and ultrasonic dispersion.

The suspension polymerization is then started by heating the dispersion in which the oily mixture is dispersed into oil globules in the aqueous dispersion medium. During the polymerization reaction, the dispersion is preferably agitated gently to prevent the floating of monomers and sedimentation of polymerized heat-expandable microspheres.

The polymerization temperature can be settled optionally depending on the variant of the polymerization initiator, and is preferably adjusted within the range from 30 to 100° C., and more preferably from 40 to 90° C. The polymerization temperature is preferably maintained for about 1 to 20 hours. The initial pressure for the polymerization is not specifically restricted, and is preferably controlled within the range from 0 to 5 MPa in gauge pressure, and more preferably from 0.1 to 3 MPa.

In the process of the present invention, a metal salt or an organic compound containing a metal of the Group 3 to 12 in the Periodic table may be added to the slurry after the polymerization (the dispersion liquid containing heat-expandable microspheres) to cross-link a metal ion and the carboxyl groups or surface-treat the microspheres with the organic compound containing a metal of the Group 3 to 12 in the Periodic table in order to further improve the heat resistance and solvent resistance of the microspheres.

The organic compound containing a metal of the Group 3 to 12 in the Periodic table is the same as the metal-containing organic compounds mentioned above. The metal-containing organic compound is preferably water-soluble for efficient surface treatment. The metal ions constituting the metal salt are the same as the metal ions mentioned above. The metal salt is preferably water-soluble for easy addition, though water-insoluble metal salts may also be used.

The resultant slurry is filtered with a centrifugal separator, press filter or suction extractor to be processed into a cake with a water content ranging from 10 to 50 wt %, preferably from 15 to 45 wt % and more preferably from 20 to 40 wt %. The cake is dried in a tray drier, indirect heating oven, fluidized bed dryer, vacuum dryer, vibration dryer or flash dryer to be processed into dry powder with a moisture content not greater than 6 wt %, preferably not greater than 5 wt % and more preferably not greater than 4 wt %.

The cake may be washed with water and/or redispersed in water and filtered again before the drying process for the purpose of decreasing the content of the ionic substances. The slurry may also be dried with a spray dryer or fluidized bed dryer to be processed into dry powder.

Hollow Particles

The hollow particles of the present invention are manufactured by heating and expanding the heat-expandable microspheres mentioned above and the heat-expandable microspheres produced in the process mentioned above. The hollow particles are lightweight and exhibit excellent properties in the composition or formed product.

The hollow particles of the present invention are manufactured by heating and expanding the heat-expandable microspheres mentioned above and the heat-expandable microspheres produced in the process mentioned above, and have high heat resistance and good solvent resistance.

The hollow particles of the present invention are manufactured by heating and expanding the heat-expandable microspheres mentioned above and the heat-expandable microspheres produced in the process mentioned above preferably at a temperature ranging from 100 to 400° C. The thermal expansion process is not specifically restricted and any of dry thermal expansion and wet thermal expansion processes may be employed.

The mean particle size of the hollow particles is not specifically restricted, and can be optionally designed according to the application of the particles. The mean particle size preferably ranges from 1 to 1000 μm, and more preferably from 3 to 200 μm. The coefficient of variation, CV, of the particle size distribution of the hollow particles is not specifically restricted, and preferably is not higher than 50%, and more preferably not higher than 40%.

The true specific gravity of the hollow particles is not specifically restricted, and preferably ranges from 0.005 to 0.6, more preferably from 0.015 to 0.4 and most preferably from 0.020 to 0.3. Hollow particles having a specific gravity less than 0.005 may have poor durability. On the other hand, hollow particles having a specific gravity greater than 0.6 may not be cost-effective. This is because such hollow particles have poor lightweight effect and a high amount of the hollow particles is required to prepare the composition containing the hollow particles.

Figure 2:
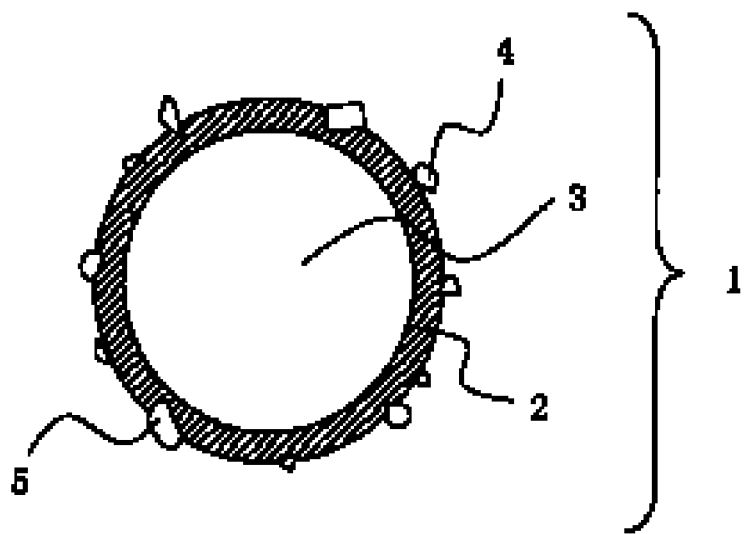
FIG. 2 is a schematic diagram of an example of the hollow particles

The hollow particles (1) may include fine particles (4 and 5) coating the outer surface of their shell (2) as shown in FIG. 2, and such hollow particles are hereinafter sometimes referred to as fine-particle-coated hollow particles (1).

The coating mentioned here mean that the particulate filler, i.e., the fine particles (4 and 5), is in a state of adhesion (4) on the shell (2) of the hollow particles (1), or in a state of fixation in a dent (5) on the outer surface of the shell of the hollow particles as the result of the particulate filler pushing into the thermoplastic resin shell melted by heat. The particle shape of the particulate filler may be irregular or spherical.

The fine particles, which are usually added to the composition prepared by blending the hollow particles and the base component, can be coated on the outer surface of the hollow particles before they are blended with the base component. Such work enables easy dispersion of the fine particles which are usually difficult to disperse uniformly.

The mean particle size of the fine particles is not specifically restricted, and is selected depending on hollow particles to be coated. The mean particle size of the fine particles preferably ranges from 0.001 to 30 μm, more preferably from 0.005 to 25 μm, and most preferably from 0.01 to 20 μm.

The fine particles of various materials including both inorganic and organic substances may be employed. The shape of the fine particles includes spherical, needle-like and plate-like shapes.

The fine particles include, for example, organic fine particles including metal soaps such as magnesium stearate, calcium stearate, zinc stearate, barium stearate and lithium stearate; synthetic waxes, such as polyethylene wax, lauric amide, myristic amide, palmitic amide, stearic amide and hydrogenated castor oil; and organic fillers, such as polyacrylamide, polyimide, nylon, polymethylmethacrylate, polyethylene and polytetrafluoroethylene. Examples of inorganic fine particles include talc, mica, bentonite, sericite, carbon black, molybdenum disulfide, tungsten disulfide, carbon fluoride, calcium fluoride and boron nitride; and other inorganic fillers, such as silica, alumina, isinglass, colloidal calcium carbonate, heavy calcium carbonate, calcium hydroxide, calcium phosphate, magnesium hydroxide, magnesium phosphate, barium sulfate, titanium dioxide, zinc oxide, ceramic beads, glass beads, and crystal beads.

The mean particle size of the fine particles is preferably not greater than 10% of the mean particle size of the fine-particles-coated hollow particles. The mean particle size mentioned here is the mean particle size of the primary particles.

The fine-particle-coated hollow particles are useful for preparing a paint composition or adhesive composition by blending the hollow particles in the compositions mentioned below.

The fine-particle-coated hollow particles can be manufactured by heating and expanding the fine-particle-coated heat-expandable microspheres. A preferable process for producing the fine-particle-coated hollow particles includes the steps of blending heat-expandable microspheres and fine particles (blending step), and heating the mixture prepared in the blending step at a temperature higher than the softening point mentioned above to expand the heat-expandable microspheres and simultaneously adhere the fine particles on the outer surface of the shell of the resultant hollow particles (adhering step).

The true specific gravity of the fine-particle-coated hollow particles is not specifically restricted, and preferably ranges from 0.01 to 0.6, more preferably from 0.03 to 0.5, further more preferably from 0.05 to 0.4, and most preferably from 0.07 to 0.3. Fine-particle-coated hollow particles having a true specific gravity less than 0.01 may have poor durability. On the other hand, fine-particle-coated hollow particles having a true specific gravity greater than 0.6 may not be cost-effective, because such fine-particle-coated hollow particles have a poor lightweight effect, and a high amount of the fine-particle-coated hollow particles is required to prepare the composition containing the fine-particle-coated hollow particles.

Compositions and Formed Products

The composition of the present invention contains at least one particulate material selected from the group consisting of the heat-expandable microspheres of the present invention, the heat-expandable microspheres produced in the process of the present invention and the hollow particles of the present invention, and a base component.

The base component is not specifically restricted, and includes, for example, rubbers, such as natural rubbers, isoprene rubber (IR), butadiene rubber (BR), styrene-butadiene rubber (SBR), chloroprene rubber (CR), nitrile rubber (NR), butyl rubber, silicone rubber, acrylic rubber, urethane rubber, fluororubber and ethylene-propylene-diene rubber (EPDM); thermosetting resins, such as epoxy resins, phenolic resins, unsaturated polyester resins and polyurethane; waxes, such as polyethylene waxes and paraffin waxes; thermoplastic resins, such as ethylene-vinyl acetate copolymer (EVA), polyethylene, modified polyethylene, polypropylene, modified polypropylene, modified polyolefin, polyvinyl chloride resin (PVC), acrylic resin, thermoplastic polyurethane, acrylonitrile-styrene copolymer (AS resin), acrylonitrile-butadiene-styrene copolymer (ABS resin), polystyrene (PS), polyamide resins (nylon 6, nylon 66 etc.), modified polyamide, polycarbonate, polyethylene terephthalate (PET), polybutylene terephthalate (PBT), polyacetal (POM), polyphenylene sulfide (PPS), polyphenylene ether (PPE) and modified polyphenylene ether; ionomer resins, such as ethylene ionomers, urethane ionomers, styrene ionomers and fluorine ionomers; thermoplastic elastomers, such as olefin elastomers, styrene elastomers and polyester elastomers; bioplastics, such as polylactic acid (PLA), cellulose acetate, PBS, PHA and starch resins; sealing materials, such as modified silicones, polyurethanes, polysulfides, acrylates, silicones, polyisobutylenes and butyl rubbers; paint components, such as urethane polymers, ethylene-vinyl acetate copolymers, vinyl chloride polymers and acrylate polymers; and inorganic materials, such as cement, mortar and cordierite.

The composition of the present invention is prepared by mixing these base components and the heat-expandable microspheres and/or hollow particles. The composition prepared by mixing the base component and heat-expandable microspheres and/or hollow particles may be blended with another base component to be prepared into the composition of the present invention.

The amount of the heat-expandable microspheres and/or hollow particles preferably ranges from 0.1 to 70 parts by weight to 100 parts by weight of the base component, more preferably from 0.5 to 65 parts by weight and further more preferably from 1 to 60 parts by weight.

The process for mixing the ingredients is not specifically restricted, and the ingredients are preferably mixed with a kneader, roller kneader, mixing roller, mixer, single screw kneader, twin screw kneader or multi-screw kneader.

The application of the composition of the present invention includes, for example, molding compositions; paint compositions, clay compositions, fiber compositions, adhesive compositions and powder compositions.

The composition of the present invention can be used as the master batch for resin molding if the composition contains the heat-expandable microspheres and the base component including compounds and/or thermoplastic resins having a melting point lower than the expansion initiation temperature of the heat-expandable microspheres (for example, waxes, such as polyethylene waxes and paraffin waxes; thermoplastic resins, such as ethylene-vinyl acetate copolymer (EVA), polyethylene, modified polyethylene, polypropylene, modified polypropylene, modified polyolefin, polyvinyl chloride resin (PVC), acrylic resin, thermoplastic polyurethane, acrylonitrile-styrene copolymer (AS resin), acrylonitrile-butadiene-styrene copolymer (ABS resin), polystyrene (PS), polycarbonate, polyethylene terephthalate (PET), and polybutylene terephthalate (PBT); ionomer resins, such as ethylene ionomers, urethane ionomers, styrene ionomers, and fluorine ionomers; and thermoplastic elastomers, such as olefin elastomers, styrene elastomers and polyester elastomers). The master-batch composition for resin molding is preferably employed in injection molding, extrusion molding and press molding for the purpose of introducing bubbles into molded products. Resins used for resin molding can be selected from the base component mentioned above without restriction, and include, for example, ethylene-vinyl acetate copolymer (EVA), polyethylene, modified polyethylene, polypropylene, modified polypropylene, modified polyolefin, polyvinyl chloride resin (PVC), acrylic resin, thermoplastic polyurethane, acrylonitrile-styrene copolymer (AS resin), acrylonitrile-butadiene-styrene copolymer (ABS resin), polystyrene (PS), polyamide resins (nylon 6, nylon 66, etc.), modified polyamide, polycarbonate, polyethylene terephthalate (PET), polybutylene terephthalate (PBT), polyacetal (POM), polyphenylene sulfide (PPS), polyphenylene ether (PPE), modified polyphenylene ether, ionomer resins, olefin elastomers, styrene elastomers, polyester elastomers, polylactic acid (PLA), cellulose acetate, PBS, PHA, starch resins, natural rubbers, isoprene rubber (IR), butadiene rubber (BR), styrene-butadiene rubber (SBR), chloroprene rubber (CR), nitrile rubber (NR), butyl rubber, silicone rubber, acrylic rubber, urethane rubber, fluororubber, ethylene-propylene-diene rubber (EPDM), and their mixtures. The composition may optionally contain reinforcing fibers, such as glass fiber, carbon fiber and natural fibers; inorganic powders, such as talc, titanium oxide, silica and inorganic pigments; organic powders, such as polymer particulates including acrylic particulate, styrene particulate, urethane particulate and silicone particulate, and organic pigments; flame retardants; and chemical blowing agents.

The formed product of the present invention can be manufactured by forming the composition. The formed product of the present invention includes, for example, molded products and coating films. The formed products of the present invention have improved lightweight effect, porosity, sound absorbing performance, thermal insulation, design potential, shock absorbing performance and strength, and low thermal conductivity and dielectric property.

The formed products containing inorganic materials as the base component can be further burnt to be processed into ceramic filters and the like.

The composition and formed product of the present invention contain at least one particulate material selected from the group consisting of the heat-expandable microspheres of the present invention, the heat-expandable microspheres produced by the process of the present invention and the hollow particles of the present invention, and thus the composition and formed product have high heat resistance, good solvent resistance and excellent expansion performance.

EXAMPLE

Examples of the heat-expandable microspheres of the present invention are specifically described below, though the present invention is not restricted within the scope of those examples. The percentage (%) mentioned in the following examples and comparative examples means weight percent (wt %) unless otherwise specified.

The properties of the heat-expandable microspheres of the following examples and comparative examples were measured as described below, and their respective performances were also evaluated. The heat-expandable microspheres hereinafter are also referred to as "microspheres" for concise expression.

Determination of the Mean Particle Size

A sample of microspheres was analyzed with a laser diffraction-scattering particle size analyzer (Microtrac ASVR, supplied by Nikkiso). The mean volume diameter D50 determined in the analysis was defined as the mean particle size.

Determination of the Expansion-Initiation Temperature (Ts) and the Maximum Expansion Temperature (Tm) of Heat-Expandable Microspheres The maximum expansion temperature was determined with a DMA (DMA Q800, manufactured by TA Instruments). In an aluminum cup of 4.8 mm deep and 6.0 mm in diameter, 0.5 mg of a sample of heat-expandable microspheres is placed, and the cup is covered with an aluminum cap (5.6 mm in diameter and 0.1 mm thick) to prepare a test sample. The test sample is set on the device and subjected to the pressure of 0.01 N with the compression unit of the device, and the height of the sample is measured. The sample is then heated by elevating the temperature at the rate of 10° C./min from 20 to 350° C., being subjected to the pressure of 0.01 N with the compression unit, and the change in the height of the sample is measured. The temperature at which the height started to increase is determined as the expansion-initiation temperature (Ts) and the temperature at which the compression unit indicated the highest position (D max) is determined as the maximum expansion temperature (Tm).

Determination of Solvent Resistance

In a glass vessel, 29 g of N,N-dimethylformamide and 1 g of heat-expandable microspheres is added and shaken for 24 hours to prepare swelled microspheres. Then the mixture is separated with a centrifugal separator and the supernatant is removed. The gel remaining in the glass vessel is dried into a solid in a vacuum oven at 130° C. The weight of the dried matter is measured and the weight change of the heat-expandable microspheres after the immersion in N,N-dimethylformamide is calculated by the following formula.

Weight change (%)=(Weight of the dried matter/weight of the thermoplastic resin in 1 g of the microspheres)×100

The weight of the thermoplastic resin contained in 1 g of the heat-expandable microspheres is calculated based on the weight of the blowing agent encapsulated in the heat-expandable microspheres which is obtained in quantitative analysis by gas chromatography.

Example 1

An aqueous dispersion medium was prepared by adding 150 g of sodium chloride, 50 g of colloidal silica containing 20 wt % of silica, 4.0 g of polyvinyl pyrolidone and 1.0 g of ethylenediaminetetraaceticacid tetrasodiumsalt to 600 g of deionized water and adjusting the pH of the mixture within the range from 2.0 to 3.0.

An oily mixture was prepared by mixing 76 g of acrylonitrile, 40 g of methacrylonitrile, 180 g of methacrylic acid, 3 g of 2-hydroxyethylacrylate, 1 g of 1,9-nonanediol diacrylate, 30 g of isopentane, 30 g of isooctane and 8 g of the liquid containing 50% of di-sec-butyl peroxydicarbonate.

The aqueous dispersion medium and the oily mixture were mixed and agitated with a Homo-mixer to be prepared into a suspension. Then the suspension was transferred to a compressive reactor of 1.5-liter capacity, purged with nitrogen, and polymerized at 60° C. for 20 hours with agitation under the initial reaction pressure of 0.2 MPa. The resultant polymerization product was filtered and dried to be made into heat-expandable microspheres. The mean particle size, expansion-initiation temperature, maximum expansion temperature, highest position and solvent resistance of the resultant heat-expandable microspheres were determined. The result is shown in Table 1.

Examples 2 to 16 and Comparative Examples 1 to 6

Heat-expandable microspheres were produced in the same manner as that of Example 1, except that the oily mixture was replaced by those shown in Tables 1 to 3. The mean particle size, expansion-initiation temperature, maximum expansion temperature, highest position and solvent resistance of the resultant heat-expandable microspheres were measured. The results are shown in Tables 1 to 3.

TABLE 1

| Oily mixture | | Example | | | | | | | |
|---|---|---|---|---|---|---|---|---|---|
| | | 1 | 2 | 3 | 4 | 5 | 6 | 7 | 8 |
| Monomer (A) | AN | 76 | | 5 | 4 | 40 | 3 | 90 | 60 |
| | MAN | 40 | 135 | 126 | 136 | 90 | 127 | 30 | 40 |
| Monomer (B) | MAA | 180 | 164 | 165 | 150 | 165 | 170 | 180 | 150 |
| | AA | | | | | | | | 40 |
| Monomer (C) | HOA | 3 | 1 | | | | | 7 | 4 |
| | HOP | | | 3 | | | | | |
| | GMA | | | | | 5 | 2 | 3 | |
| | NMAAM | | | | 10 | | | | |

TABLE 1-continued

|  | Oily mixture | Example 1 | 2 | 3 | 4 | 5 | 6 | 7 | 8 |
|---|---|---|---|---|---|---|---|---|---|
| Monomer (D) | MMA |  |  |  |  |  |  |  | 5 |
|  | MA |  |  |  |  |  |  |  |  |
|  | MAM |  |  |  |  |  |  |  |  |
|  | DMAAM |  |  |  |  |  |  |  |  |
|  | St |  |  |  |  |  |  |  |  |
|  | VCl2 |  |  |  |  |  |  |  |  |
| Cross-linking agent | 1.9ND-A | 1 |  | 1 |  |  |  |  |  |
|  | TMP |  |  |  |  |  |  |  |  |
|  | EDMA |  |  |  |  |  |  |  | 1 |
| Blowing agent | Isopentane | 30 | 15 |  |  |  |  | 10 | 20 |
|  | Isooctane | 30 | 60 | 30 | 80 | 80 | 70 | 50 | 50 |
|  | Isododecane |  |  | 40 |  |  |  |  |  |
| Amount of Monomer A (wt %) |  | 38.7 | 45.0 | 43.8 | 46.7 | 43.3 | 43.3 | 40.0 | 33.3 |
| Amount of Monomer B (wt %) |  | 60.0 | 54.7 | 55.0 | 50.0 | 55.0 | 56.7 | 60.0 | 63.3 |
| Amount of Monomer C (wt %) |  | 1.0 | 0.3 | 1.0 | 3.3 | 1.7 | 0.7 | 3.3 | 1.3 |
| Ratio of Monomer (B) to Monomer (C) |  | 60:1 | 164:1 | 55:1 | 15:1 | 33:1 | 85:1 | 18:1 | 47.5:1 |
| Amount of MAN in Monomer (A) (wt %) |  | 34.5 | 100.0 | 96.2 | 97.1 | 69.2 | 97.7 | 25.0 | 40.0 |
| Mean particle size (μm) |  | 25 | 20 | 30 | 30 | 33 | 32 | 30 | 26 |
| Expansion initiation temp. (Ts, °C.) |  | 190 | 205 | 220 | 190 | 195 | 200 | 205 | 185 |
| Maximum expansion temp. (Tm, °C.) |  | 260 | 250 | 280 | 240 | 260 | 255 | 265 | 235 |
| Highest position (Dmax, μm) |  | 2500 | 2000 | 2200 | 2200 | 1600 | 2300 | 1200 | 2000 |
| Weight change (%) |  | 115 | 105 | 111 | 110 | 113 | 107 | 115 | 112 |

TABLE 2

|  | Oily mixture | Example 9 | 10 | 11 | 12 | 13 | 14 | 15 | 16 |
|---|---|---|---|---|---|---|---|---|---|
| Monomer (A) | AN | 10 | 60 | 65 | 70 | 90 |  | 80 | 7 |
|  | MAN | 110 | 42 | 50 | 30 | 40 | 127 | 40 | 100 |
| Monomer (B) | MAA | 130 | 130 | 120 | 150 | 160 | 160 | 160 | 10 |
|  | AA |  |  |  |  |  |  |  | 160 |
| Monomer (C) | HOA | 6 |  |  |  |  | 2 | 10 |  |
|  | HOP |  | 8 |  |  |  |  |  |  |
|  | GMA |  |  | 5 | 0.5 | 4 | 1 |  | 8 |
|  | NMAAM |  |  |  |  |  |  |  |  |
| Monomer (D) | MMA |  |  |  |  | 6 |  | 4 | 10 |
|  | MA |  |  |  |  |  | 10 |  |  |
|  | MAM | 23 | 30 | 40 | 50 |  |  |  |  |
|  | DMAAM |  |  |  |  |  |  |  |  |
|  | St | 20 | 30 | 20 |  |  |  |  |  |
|  | VCl2 |  |  |  |  |  |  | 6 | 4 |
| Cross-linking agent | 1.9ND-A |  | 0.3 |  | 0.2 |  |  |  |  |
|  | TMP | 1 |  |  |  | 0.2 |  | 0.5 |  |
|  | EDMA |  |  | 0.3 |  |  |  |  | 1 |
| Blowing agent | Isopentane |  | 30 |  | 10 | 20 |  | 30 |  |
|  | Isooctane | 75 | 40 | 60 | 50 | 50 | 70 | 30 | 80 |
|  | Isododecane |  |  | 10 | 10 |  |  |  |  |
| Amount of Monomer A (wt %) |  | 40.0 | 34.0 | 38.3 | 33.3 | 43.3 | 42.7 | 39.9 | 35.7 |
| Amount of Monomer B (wt %) |  | 43.3 | 43.3 | 40.0 | 49.9 | 53.3 | 53.3 | 53.2 | 56.7 |
| Amount of Monomer C (wt %) |  | 2.0 | 2.7 | 1.7 | 0.2 | 1.3 | 1.0 | 3.3 | 2.7 |
| Ratio of Monomer (B) to Monomer (C) |  | 21.7:1 | 16.3:1 | 24:1 | 300:1 | 40:1 | 53.3:1 | 16:1 | 4.7:1 |
| Amount of MAN in Monomer (A) (wt %) |  | 91.7 | 41.2 | 43.5 | 30.0 | 30.8 | 100.0 | 33.3 | 93.5 |
| Mean particle size (μm) |  | 23 | 18 | 20 | 45 | 42 | 28 | 22 | 30 |
| Expansion initiation temp. (Ts, °C.) |  | 210 | 185 | 205 | 200 | 190 | 210 | 185 | 190 |
| Maximum expansion temp. (Tm, °C.) |  | 275 | 255 | 260 | 270 | 255 | 260 | 215 | 220 |
| Highest position (Dmax, μm) |  | 1900 | 2400 | 2000 | 2200 | 2350 | 2000 | 1300 | 1500 |
| Weight change (%) |  | 112 | 106 | 105 | 102 | 108 | 107 | 111 | 105 |

TABLE 3

| | Oily mixture | Comparative Example 1 | 2 | 3 | 4 | 5 | 6 |
|---|---|---|---|---|---|---|---|
| Monomer (A) | AN | 148 | 148 | 30 | 87 | 60 | 90 |
| | MAN | | 53 | 100 | 147 | 40 | 10 |
| Monomer (B) | MAA | 76 | 76 | 170 | 60 | 100 | 200 |
| | AA | | | | | | |
| Monomer (C) | HOA | | | | | 50 | 0.2 |
| | HOP | | | | | | |
| | GMA | | 16 | | 6 | 50 | |
| | NMAAM | 16 | | | | | |
| Monomer (D) | MMA | | | | | | |
| | MA | | | | | | |
| | MAM | | | | | | |
| | DMAAM | 53 | | | | | |
| | St | | | | | | |
| | VCl2 | | | | | | |
| Cross-linking agent | 1.9ND-A | | | | 1 | | |
| | TMP | | | | | | |
| | EDMA | 0.3 | 0.3 | | | | |
| Blowing agent | Isopentane | | | | 30 | | 10 |
| | Isooctane | 50 | 50 | 80 | 60 | 80 | 60 |
| | Isododecane | | | | | | |
| Amount of Monomer A (wt %) | | 50.5 | 68.5 | 43.2 | 78.0 | 33.3 | 33.3 |
| Amount of Monomer B (wt %) | | 25.9 | 25.9 | 56.6 | 20.0 | 33.3 | 66.7 |
| Amount of Monomer C (wt %) | | 5.5 | 5.5 | 0.0 | 2.0 | 33.3 | 0.07 |
| Ratio of Monomer (B) to Monomer (C) | | 4.7:1 | 4.7:1 | — | 10:1 | 1:1 | 1000:1 |
| Amount of MAN in Monomer (A) (wt %) | | 0.0 | 26.4 | 76.9 | 62.8 | 40.0 | 10.0 |
| Mean particle size (μm) | | 20 | 22 | 35 | 32 | 20 | 30 |
| Expansion initiation temp. (Ts, °C.) | | 220 | 210 | 200 | 155 | Not expanded | 205 |
| Maximum expansion temp. (Tm, °C.) | | 260 | 255 | 230 | 180 | Not expanded | 235 |
| Highest position (Dmax, μm) | | 700 | 600 | 1700 | 600 | Not expanded | 1200 |
| Weight change (%) | | 95 | 96 | 70 | 80 | 99 | 85 |

The names of the monomer components and cross-linking agents are abbreviated in Tables 1 to 3 as described below.
AN: acrylonitrile
MAN: methacrylonitrile
MAA: methacrylic acid
AA: acrylic acid
HOA: 2-hydroxyethyl acrylate
HOP: 2-hydroxypropyl methacrylate
GMA: glycidyl methacrylate
NMAAM: N-methylol acrylamide
MMA: methyl methacrylate
MA: methyl acrylate
MAM: methacrylamide
DMAAM: N,N-dimethyl acrylamide
St: styrene
VC12: vinylidene chloride monomer
1.9ND-A: 1.9-nonanediol diacrylate
TMP: trimethylolpropane trimethacrylate
EDMA: ethylene glycol dimethacrylate The heat-expandable microspheres of Examples 1 to 16 exhibited better expansion performance at high temperatures than the heat-expandable microspheres of Comparative Examples 1 to 6, and resulted in a weight change of at least 100%. The weight change of at least 100% indicates that the shell of the heat-expandable microspheres is resistant to swelling by a solvent and the encapsulated blowing agent is well retained in the microspheres. In other words, the heat-expandable microspheres of the present invention minimize the loss of expansion performance after immersion in a solvent and have high heat resistance and good solvent resistance.

INDUSTRIAL APPLICABILITY

The heat-expandable microspheres of the present invention can be used as light weight additive to putties, paints, inks, sealants, mortar, paper clays and ceramic, etc., and also as the additive to the base components processed in injection molding, extrusion molding and press molding to be made into formed products having excellent sound insulation, thermal insulation, heat-shielding, and sound absorbency.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the invention.

The invention claimed is:
1. Heat-expandable microspheres comprising a thermoplastic resin shell and a thermally-vaporizable blowing agent encapsulated therein;
wherein the thermoplastic resin is produced by polymerizing a polymerizable component containing (A) a nitrile monomer including methacrylonitrile, (B) a carboxyl-group-containing monomer, and (C) a monomer having functional group reactive with the carboxyl group; and wherein the polymerizable component satisfies the following conditions 1 and 2,
the polymerizable component contains 20 to 50 wt % of the nitrile monomer (A), 43.3 to 65 wt % of the carboxyl-group-containing monomer (B), and 0.1 to 2.7 wt % of the monomer (C) having a functional group reactive with the carboxyl-group, and the nitrile monomer (A) comprises 25 to 100 wt % of methacrylonitrile;

Condition 1: The weight fraction of the monomers (A), (B), and (C) in the polymerizable component satisfy the inequality shown below, Weight fraction of the monomer (C)<Weight fraction of the monomer (A)≤Weight fraction of the monomer (B)     Inequality (I)

Condition 2: The ratio by weight of the monomer (B) to the monomer (C) ranges from 600:1 to 3:1.

2. The heat-expandable microspheres as claimed in claim 1, wherein the nitrile monomer (A) comprises acrylonitrile and methacrylonitrile.

3. The heat-expandable microspheres as claimed in claim 1, wherein a maximum expansion temperature of the heat-expandable microspheres is not lower than 190° C.

4. Hollow particles manufactured by expanding the heat-expandable microspheres as claimed in claim 1.

5. A composition containing a particulate material including the heat-expandable microspheres as claimed in claim 1 and a base component.

6. A formed product manufactured by forming the composition as claimed in claim 5.

7. A composition containing a particulate material including the hollow particles as claimed in claim 4 and a base component.

8. A composition containing a particulate material including the heat-expandable microspheres as claimed in claim 1, hollow particles manufactured by expanding the heat-expandable microspheres and a base component.

9. A formed product manufactured by forming the composition according to as claimed in claim 7.

10. A formed product manufactured by forming the composition as claimed in claim 8.

11. The heat-expandable microspheres as claimed in claim 1, wherein the nitrile monomer (A) comprises 30 to 96 wt % of methacrylonitrile.

* * * * *